3,230,200
SYNTHETIC LINEAR CONDENSATION POLYESTERS SUITABLE FOR MAKING WASH-WEAR FABRICS
Wayne A. Lanka, Seaford, Del., assignor to E. I. du Pont de Nemours and Company, Wilmington, Del., a corporation of Delaware
No Drawing. Filed May 25, 1961, Ser. No. 112,523
2 Claims. (Cl. 260—75)

This invention is concerned with novel polymers useful in the manufacture of fibrous materials. More particularly, the invention is concerned with new polyesters prepared from certain aromatic acids with alicyclic dihydroxy compounds.

Among synthetic organic polymers of the condensation type, the two most widely known are polyamides and polyesters. Many varieties of polyesters are known and various methods of preparation have been described. Polyesters useful in the preparation of synthetic fibers and films are described, for example, in U.S. 2,012,267, U.S. 2,071,250, U.S. 2,035,578, U.S. 2,465,319, U.S. 2,465,150, U.S. 2,595,343, and U.S. 2,901,466. Widespread public use of textile fibers prepared from certain of these polyesters, e.g., polyethylene terephthalate, has resulted because of their inherent high strength and toughness, and low moisture absorption. Great strides have been made toward preparing fabrics from these fibers which may be made into "wash-and-wear" garments, i.e., garments which may be washed and worn with little or no ironing. However, completely satisfactory fibers and fabrics for this purpose have not yet been developed. Also, many polyester fibers have a low softening temperature which makes them unsuitable for fabrics which may be exposed to elevated temperatures, as in ironing.

Recent investigation of the factors affecting "wash-wear" properties of fabrics, and correlation of wash-wear behavior with fiber properties, has revealed that the two most important fiber properties affecting "wash-wear" behavior, i.e., wrinkle resistance and crease retention, are ability to recover from bending and ability to recover from low tensile strains. It is now recognized that the fiber with the better ability to recover from bending and tensile strain is capable of making the better wash-wear fabric. Thus, laboratory tests of bending and tensile strain recovery may be used with assurance in predicting the wash-wear behavior of fibers prepared from new polymers. The use of these laboratory tests has led to the discovery of the polymers of this invention.

It is an object of this invention to provide a novel polyester composition. A further object is the provision of a new polyester composition useful in the formation of fibers, films, and like structures. A still further object is the provision of novel polyester fibers having good recovery properties. Another object is the provision of a novel polyester composition having a high softening temperature.

These objects are accomplished in accordance with this invention in a synthetic linear condensation polyester composition comprising recurring units of the structural formula:

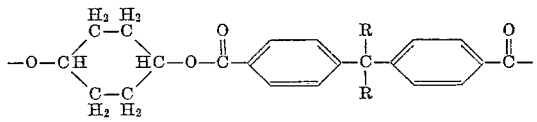

wherein R and R' may be hydrogen or an alkyl radical having 1 to 4 carbon atoms.

For fiber-forming characteristics, the polyesters of this invention preferably have an intrinsic viscosity of at least about 0.4.

The novel polyesters of this invention may be prepared by heating, for example, equimolecular parts of 1,4-cyclohexane-diol and an acid chloride such as bis(p-carboxyphenyl)methane or 2,2-bis(p-carboxyphenyl)propane in an inert solvent, e.g., tetrachloroethane.

Alternatively, the polyesters of this invention may be prepared by heating, for example, equimolecular proportions of 1,4-cyclohexane-diol and the dimethyl ester of an acid such as bis(p-carboxyphenyl)methane or 2,2-bis(p-carboxyphenyl)propane in the presence of an inert solvent such as 1,2,4-trichlorobenzene and a catalyst, e.g., tetraisopropyltitanate. Methanol is removed from the reaction mixture by distillation. After the polymerization is complete, the solvent may be removed by placing the mixture under a good vacuum for several hours. If a still higher molecular weight is desired, the solid polymer may be further polymerized by breaking it into small particles and then heating the finely divided polymer under vacuum at temperatures up to 15° C. below its melting point for several hours.

The polyesters of this invention are characterized by low moisture sensitivity, insolubility in common organic liquids, good color, toughness, and a high softening temperature, i.e., above 250° C. In addition, the polymers have good resistance to discoloration upon exposure to heat and to ultraviolet light. The polymers are readily formed into useful structures such as fibers and films by known techniques. For example, the polymers may be dissolved in appropriate solvent and cast into a film or dry spun to give textile fibers.

It has been found that in the polymers of this invention, the trans- form of 1,4-cyclohexane-diol gives higher polymer melting temperatures than the cis- form. Polymers of intermediate melting temperatures may be prepared by using mixtures of the cis- and trans- forms of 1,4-cyclohexane-diol.

Fabrics prepared from fibers of this composition are wrinkle-resistant, have excellent crease-recovery, and in garments require little or no ironing for maintenance of neat appearance. The utility of fibers prepared from the polymers of this invention in wash-and-wear garments is readily demonstrated by the high values obtained for these fibers in laboratory recovery tests such as the test for wash-set recovery angle (WSRA) and a modified tensile strain recovery test (MTSR).

Wash-set recovery angle (WSRA) has been found to be a satisfactory yarn test for predicting the ability of a fabric prepared from that yarn to recover from wrinkling. For the purposes of this invention, a satisfactory method for measuring WSRA is as follows:

A prepared fiber sample, several inches long, is bent 360° around a wire mandrel prepared from No. 22 B. & S. gauge wire and held in place by a tensile load of 0.05 g.p.d. The bent fiber is then submerged in a dilute detergent solution at a temperature of 60° C. for a period of two minutes. The fiber is rinsed in cold distilled water for about one-half minute, and then blotted dry with facial tissues. The fiber is then further dried by being held for one to two hours in an atmosphere having a relative humidity of 15%, still maintaining the 360° loop under load. The load is then removed from the completely dry fiber and the fiber allowed to recover from its bent position for a period of 8 hours, while being maintained in a 15% R.H. atmosphere. The angle of bend in the recovered fiber is then measured. A convenient means of measuring this angle is by projecting a shadow or image of the fiber onto a screen, as for example, with a projecting microscope. The "wash-set recovery angle" is the number of circular degrees of recovery from the original 360° bend. The correlation of WSRA with wrinkle recovery is obvious from the following values obtained with illustrative known fibers in the above-described test:

| Fiber: | WSRA, ° |
|---|---|
| Wool | 0 |
| Silk | 15 |
| Cotton | 55 |
| 66 nylon | 155 |
| Polyethylene terephthalate | 210 |

The polymers of this invention are capable of forming fibers which exhibit WSRA values higher than 300°.

The ability of a fiber to recover from low levels of extension has also been found to correlate well with the wash-and-wear performance of fabrics prepared from that fiber. One satisfactory laboratory test for measuring tensile strain recovery is as follows:

A 10-inch sample of a yarn or monofilament is mounted on an Instron Tensile Testing machine and dried in a slack condition at 80° C. for a period of 4 minutes. After cooling for 1 minute, the sample is then immersed in a water bath maintained at 40° C. for a period of 2 minutes and then stretched, in the water bath, at an elongation rate of 1 inch per minute. Upon reaching the desired total elongation, the sample is held at constant length for an additional 2 minutes and then the water bath is removed. The load on the fiber is then reduced to a value of 0.042 gram per denier and the fiber is allowed to retract while again being dried at a temperature of 80° C. for 4 minutes. The heater is then removed and the fiber cooled an additional 1 minute before the final length is measured. Percent recovery is calculated from the formula:

$$\frac{\text{units of retraction}}{\text{units of elongation}} \times 100$$

This procedure is carried out for elongations of 0.5, 1, 2, and 3%, and a graph is prepared by plotting the percent recovery against total elongation in the range 0–3%. MTSR values are average percent recovery values from the range 0–3% elongation which may be determined from the graph by usual graphical averaging procedures.

The polymers of this invention are capable of forming fibers which exhibit MTSR values higher than 60%.

The term "intrinsic viscosity" is defined as the limit of the fraction $$\frac{\ln(r)}{c}$$

as $c$ approaches 0, where $r$ is the relative viscosity and $c$ is the concentration in grams per 100 ml. of solution. The relative viscosity in the ratio of the viscosity of a solution of the polymer in a mixture of 10 parts of phenol and 7 parts of 2,4,6-trichlorophenol (by weight) to the viscosity of the phenol-trichlorophenol mixture, per se, measured in the same units at 25° C. Intrinsic viscosity is a measure of the degree of polymerization.

This invention is further illustrated by the following examples:

*Example I*

3.4 mols of acetyl chloride are placed in a dry flask under nitrogen and cooled to about −40° C. in an acetone-Dry Ice bath. 0.92 mol of anhydrous aluminum chloride is added and then 0.2 mol of diphenyl methane is added slowly over a period of 3 minutes. HCl is evolved and the temperature rises to about 10°. After holding for 30 minutes at a temperature between 10 and 15° the reaction mixture is poured slowly onto 1500 grams of ice, stirred for 1 hour, and then filtered. The solid is washed with water, washed with 2% NaOH, dissolved in carbon tetrachloride, concentrated, and then diluted with heptane to give 40 grams of solid bis(p-acetophenyl)-methane having a melting point of 91–93° C.

0.34 mol of bis(p-acetophenyl)methane is dissolved in 360 cc. of dioxane and added slowly to stirred, alkaline sodium hypochloride, and the temperature of the mixture maintained between 40 and 80° C. After the exothermic reaction is completed, the mixture is held at 50–60° C. for an hour, and then excess hypochlorite destroyed by the addition of acetone. The reaction mixture is cooled, acidified, and filtered to give bis(p-carboxyphenyl)-methane. The crude acid is purified by converting to the sodium salt and recrystallizing from water.

250 ml. of thionyl chloride is added to 84 grams of bis(p-carboxyphenyl)methane in the presence of a catalytic amount of pyridine. The mixture is heated for 4 hours, excess thionyl chloride removed by distillation under vacuum, and the crude methylene dibenzoyl chloride recrystallized from n-heptane and distilled.

A mixture of 0.10 mol of the trans- isomer of 1,4-cyclohexane-diol, 0.10 mol of methylene dibenzoyl chloride, and 400 ml. of tetrachloroethane is heated to reflux under nitrogen, for a period of 70 hours. Hydrogen chloride gas is evolved. The reaction mixture is poured into petroleum ether and the precipitated polymer washed with n-heptane and then dried. The polymer is found to have an intrinsic viscosity of 0.61 and a softening temperature of 285–290° C.

The polymer is found to be insoluble in carbon tetrachloride and tetrachloroethylene as well as the common solvents water, methanol, ethanol, hexane, cyclohexane, benzene, toluene, xylene, ether, tetrahydrofuran, methyl, acetate, ethyl acetate, and the like.

*Example II*

A mixture of 0.10 mol of the cis- isomer of 1,4-cyclohexane-diol, 0.10 mol of methylene dibenzoyl chloride, and 400 ml. of tetrachloroethane is heated to reflux, under nitrogen, for a period of 110 hours. Hydrogen chloride is evolved rapidly during the first few hours and then slowly until the heating is completed. The reaction mixture is poured into petroleum ether, and the precipitated polymer washed with n-heptane and then dried. The polymer is found to have an intrinsic viscosity of 0.79 and a polymer softening temperature of 255–260° C.

*Example III*

About 250 ml. of thionyl chloride is added to 75 grams of 2,2-bis(p-carboxyphenyl)propane and the mixture heated to reflux with a catalytic amount of pyridine for about 4 hours. Excess thionyl chloride is removed by distillation under vacuum and the crude acid chloride is recrystallized from n-heptane and distilled, B.P. 210° C./5 mm. Further recrystallization from n-heptane gives purified isopropylidene dibenzoyl chloride having a melting point of 96–97° C.

A mixture of 0.10 mol of the trans- isomer of 1,4-cyclohexane-diol, 0.10 mol of isopropylidene dibenzoyl chloride (prepared above), and 500 ml. of o-dichlorobenzene is stirred by bubbling nitrogen through the mixture and heated to reflux for a period of 94 hours. Hydrogen chloride is evolved during the first part of the reaction. The reaction mixture is poured into petroleum ether, and the precipitated polymer washed with n-heptane and then dried. The polymer is found to have an intrinsic viscosity of 0.61, measured in a mixture of methylene chloride and trifluoroacetic acid. The polymer softening temperature is 295–300° C.

*Example IV*

A mixture of 0.025 mol of cis-1,4-cyclohexane-diol, 0.025 mol of isopropylidene dibenzoyl chloride, and 100 ml. of tetrachloroethane is heated to reflux, with nitrogen stirring, for a period of 48 hours. Hydrogen chloride is evolved during the first part of the reaction. The reaction mixture is poured into petroleum ether, and the precipitated polymer washed with n-heptane and dried. The polymer is found to have an intrinsic viscosity of 0.62 and a polymer softening temperature of 275° C.

*Example V*

A mixture of 0.050 mol of cis-1,4-cyclohexane-diol, 0.050 mol of trans-1,4-cyclohexane-diol, 0.10 mol of isopropylidene dibenzoyl chloride, and 500 ml. of o-dichlorobenzene is heated to reflux, with stirring by bubbling nitrogen gas through the mixture, for a period of 90 hours. The reaction mixture is poured into petroleum ether and the precipitated white fibrous polymer is washed with n-heptane and dried. The polymer is found to have an intrinsic viscosity of 0.65 and a polymer melting temperature of 280–285°.

*Example VI*

The polymer of Example I is dissolved in an 80/20 mixture of methylene chloride and trifluoroacetic acid to give a solution having 18% solids content. The solution is dry spun according to known methods giving a 27 filament yarn having a denier of 290. The yarn is drawn on a pin heated to 100° C., using a draw ratio of 2.5×. The resultant yarn is found to have a tenacity of 1.97 g.p.d., a break elongation of 8.0% and an initial modulus of 29.9 g.p.d. The second order transition temperature, measured as described in U.S. 2,556,295, is found to be 169° C.

A portion of the polymer solution is cast into a clear, tough film which is found to have good light and heat stability, as well as excellent retention of physical properties during and after exposure to elevated temperatures.

*Example VII*

The polymer of Example II is dissolved in a 70/30 mixture of 1,1,2-trichloroethane and trifluoroacetic acid to give a solution having a solid content of 25%. The solution is dry spun according to known procedures to give a 30 filament yarn having a total denier of 281. The yarn is drawn by known methods using a draw pin heated to 100° C. and a draw ratio of 2.0×. The yarn is found to have a tenacity of about 1 g.p.d., a break elongation of 17.8%, and an initial modulus of 19.9 g.p.d. The second order transition temperature is found to be 112° C.

*Example VIII*

The polymer of Example III is dissolved in a 75/25 mixture of 1,1,2-trichloroethane and trifluoroacetic acid giving a solution having 23% solids. The solution is dry spun and the resultant yarn is drawn 11.5× using a 110° C. hot pin. The resultant yarn has a tenacity of about 1 g.p.d., a break elongation of 11.7% and an initial modulus of 20.3 g.p.d. The second order transition temperature is found to be 198° C.

*Example IX*

Yarns prepared above are evaluated for their proficiency in wash-and-wear fabrics by subjecting them to the "wash-set recovery angle" and "modified tensile strain recovery" tests previously described. The results of the tests are shown in the following table:

| Yarn Source | WSRA, deg. | MTSR, Percent |
|---|---|---|
| Example VI | 321 | 64 |
| Example VII | 333 | 70 |
| Example VIII | 305 | 69 |

The values in the table, when compared with values for previously known fibers, clearly indicate the superior performance to be realized when these polymers are incorporated in wash-and-wear fabrics.

*Example X*

Yarn prepared as in Example VI is two-plied to give a yarn of 54 filaments and 267 denier. A fabric is woven having a 126 x 80 plain-weave construction with 7 turns twist in the warp and 2 turns twist in the filling in finished form. The fabric is heat set at a temperature of 180° C.

A one-square-yard fabric sample is washed in an automatic washing machine followed by tumble drying. After successive washing and drying cycles, the appearance is rated 4.0 on a scale where 1.0 represents severe wrinkling and 5.0 represents no wrinkling. For comparison, comparable fabrics from cotton are rated 1.0, from a resin-treated commercial "wash-wear" cotton, 2.3; from a 65/35 blend of polyethylene terephthalate/cotton, 2.4; and from 100% polyethylene terephthalate fiber, 2.6.

The novel polyester compositions of this invention offer many advantages including good initial color, good resistance to discoloration upon exposure to heat and to ultraviolet light, and good resistance to hydrolytic degradation upon exposure to alkaline solutions. Furthermore, shaped articles such as fibers and films prepared from these polyesters possess a good combination of high softening temperature and high recovery from bending and tensile stress.

Any of the additives, fillers, pigments, finishes, and the like, which are conventionally added to polyester compositions, may be added to the polyesters of this invention without seriously detracting from the outstanding physical characteristics obtained.

It is to be understood that the polyesters of this invention may contain minor amounts of other ester-linking units in the polymer chain without substantial loss in polymer properties. For example, up to about 15% of the recurring structural units may contain other dicarboxylate radicals such as the adipate, sebacate, isophthalate, bibenzoate, hexahydroterephthalate, terephthalate, and similar radicals. Similarly, the polyesters may contain minor amounts of linking units from dihydroxy compounds other than 1,4-cyclohexane-diol. For example, up to about 15% of the recurring structural units may contain radicals of other dihydroxy compounds such as p,p'-diphenylolmethane, bis(p-hydroxyphenyl)ether, 2,2-bis(3-methyl-4-hydroxyphenyl)propane, bis(p-hydroxyphenyl)sulfone, 4,4'-dihydroxy-3,3'-dimethyl biphenyl, ethylene glycol, tetramethylene glycol, decamethylene glycol, p-hexahydroxylylene glycol, hydroquinone, 1,4-butanediol polyether glycol, and the like.

In a particularly important embodiment, the polyesters of this invention contain as an integral part of the polymer chain 0.5 to 5.0 mol percent of a unit bearing a sulfonate salt group. For example, the polyester may contain 0.5 to 5.0 mol percent of the radical of sodium 3,5-dicarboxybenzene sulfonate. The presence of sulfonate salt groups renders the polyesters dyeable with basic dyes.

Alternatively, the polyesters of this invention may be made dyeable with acid dyes by including minor amounts of tertiary amine groups in the molecular chain. For example, the polyesters may contain 0.5 to 5.0 mol percent of repeating units such as the radical of pyridine-3,5-dicarboxylic acid.

It will be apparent that many widely different embodiments of this invention may be made without departing from the spirit and scope thereof, and therefore it is not intended to be limited except as indicated in the appended claims.

I claim:

1. A filament of a synthetic linear 1,4-cyclohexanediol/bis(p-carboxyphenyl)alkane condensation polyester consisting of recurring units of the structural formula:

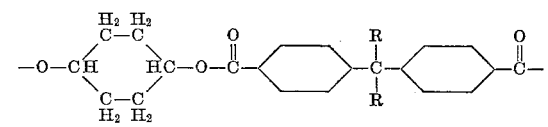

in which R and R' are selected from the group consisting of hydrogen and alkyl radicals having from 1 to 4 carbon atoms, said filament having a wash-set recovery angle above 300°, from a 360° bend around a No. 22 B and S wire, after the filament has been maintained bent around the wire under a tensile load of 0.05 gram per denier for the following wash-set treatment:

(a) Submerge in a dilute detergent solution at 60° C. for two minutes, (b) Rinse in cold distilled water for one-half minute,
(c) Blot the filament to remove water and
(d) Dry the filament for one to two hours in atmosphere at 15% relative humidity;

the fiber being allowed to recover from the treatment for eight hours in atmosphere of 15% relative humidity, with the tensile load removed, before measuring the wash-set recovery angle.

2. A filament as defined in claim 1 which has an average recovery value of higher than 60% from 0 to 3% elongations in the following treatment:
   (a) Dry 10-inch samples of the filament in a slack condition at 80° C. for four minutes,
   (b) Cool for one minute,
   (c) Immerse in a water bath maintained at 40° C. for two minutes,
   (d) Stretch in the water bath at an elongation rate of 1 inch per minute to elongations of 0.5, 1, 2 and 3%, respectively, for different samples,
   (e) Hold the elongated sample at constant length for two minutes,
   (f) Remove the water bath,
   (g) Reduce the load on the filament to 0.042 gram per denier,
   (h) Dry at 80° C. for four minutes,
   (i) Cool for one minute,
   (j) Measure the retracted filament length, calculate the percent recovery, $$\frac{\text{units of retraction}}{\text{units of elongation}} \times 100$$

and average the values graphically.

References Cited by the Examiner
UNITED STATES PATENTS

| | | | |
|---|---|---|---|
| 2,437,232 | 3/1948 | Rothrock et al. | 260—75 |
| 2,621,167 | 12/1952 | Fisher | 260—75 |
| 2,807,606 | 9/1957 | Lincoln | 260—75 |
| 2,851,437 | 9/1958 | Petropoulos | 260—75 |
| 2,901,466 | 8/1959 | Kibler et al. | 260—75 |
| 3,008,934 | 11/1961 | Wielicki et al. | 260—75 |
| 3,018,272 | 1/1962 | Griffing et al. | 260—75 |

WILLIAM H. SHORT, *Primary Examiner.*

H. N. BURSTEIN, LOUISE P. QUAST, *Examiners.*